(12) United States Patent
Gong et al.

(10) Patent No.: US 10,887,497 B2
(45) Date of Patent: Jan. 5, 2021

(54) IMAGE ACQUISITION APPARATUS BASED ON INDUSTRIAL DIGITAL CAMERA MATRIX

(71) Applicant: BEIJING QINGYING MACHINE VISUAL TECHNOLOGY CO., LTD., Beijing (CN)

(72) Inventors: Ting Gong, Beijing (CN); Zhonghui Liu, Beijing (CN); Yufeng Liu, Beijing (CN); Xing Yin, Changzhou (CN)

(73) Assignee: BEIJING QINGYING MACHINE VISUAL TECHNOLOGY CO., LTD., Beijing (CN)

( * ) Notice: Subject to any disclaimer, the term of this patent is extended or adjusted under 35 U.S.C. 154(b) by 72 days.

(21) Appl. No.: 16/329,478

(22) PCT Filed: Sep. 28, 2016

(86) PCT No.: PCT/CN2016/100543
§ 371 (c)(1),
(2) Date: Feb. 28, 2019

(87) PCT Pub. No.: WO2018/049698
PCT Pub. Date: Mar. 22, 2018

(65) Prior Publication Data
US 2019/0260980 A1      Aug. 22, 2019

(30) Foreign Application Priority Data

Sep. 13, 2016 (CN) .......................... 2016 1 0822489

(51) Int. Cl.
*H04N 13/243* (2018.01)
*H04N 5/225* (2006.01)
(Continued)

(52) U.S. Cl.
CPC ......... *H04N 5/2253* (2013.01); *H04N 5/2254* (2013.01); *H04N 13/243* (2018.05);
(Continued)

(58) Field of Classification Search
CPC .. H04N 13/243; H04N 13/296; H04N 13/282; H04N 5/2253; H04N 5/2254; H04N 2213/001
See application file for complete search history.

(56) References Cited

U.S. PATENT DOCUMENTS

2007/0236591 A1* 10/2007 Tam ................... H01L 27/1462
                                                                    348/308
2007/0263114 A1    11/2007 Gurevich et al.
(Continued)

FOREIGN PATENT DOCUMENTS

CN       101770060 A      7/2010
CN       102037717 A      4/2011
(Continued)

OTHER PUBLICATIONS

First Office Action of priority application CN201610822489.X, dated Feb. 7, 2017, and English translation.
(Continued)

*Primary Examiner* — Obafemi O Sosanya
(74) *Attorney, Agent, or Firm* — Mai-Tram D. Lauer; Westman, Champlin & Koehler, P.A.

(57) ABSTRACT

Provided is an image acquisition apparatus based on an industrial digital camera matrix, comprising a first substrate and a second substrate arranged in parallel. The first substrate is provided with a lens matrix, and axes of various lenses in the lens matrix are respectively perpendicular to a plane where the first substrate is located; and a surface, towards the first substrate, of the second substrate is provided with a photosensitive element matrix, and various (Continued)

photosensitive elements in the photosensitive element matrix are arranged in one-to-one correspondence with the various lenses.

16 Claims, 4 Drawing Sheets

(51) Int. Cl.
*H04N 13/296* (2018.01)
*H04N 13/282* (2018.01)

(52) U.S. Cl.
CPC ......... *H04N 13/282* (2018.05); *H04N 13/296* (2018.05); *H04N 2213/001* (2013.01)

(56) References Cited

U.S. PATENT DOCUMENTS

| | | | |
|---|---|---|---|
| 2011/0069189 A1* | 3/2011 | Venkataraman | G02B 3/0006 348/218.1 |
| 2013/0027564 A1 | 1/2013 | Solhusvik | |
| 2014/0016016 A1 | 1/2014 | Berestov et al. | |
| 2015/0288861 A1 | 10/2015 | Duparre | |

FOREIGN PATENT DOCUMENTS

| | | |
|---|---|---|
| CN | 203250098 U | 10/2013 |
| CN | 203416328 U | 1/2014 |
| CN | 103685881 A | 3/2014 |
| CN | 104052980 A | 9/2014 |
| CN | 104717482 A | 6/2015 |
| CN | 104917937 A | 9/2015 |
| CN | 205336395 U | 6/2016 |

OTHER PUBLICATIONS

Second Office Action of priority application CN201610822489.X, dated May 19, 2017, and English translation.
Third Office Action of priority application CN201610822489.X, dated Sep. 1, 2017, and English translation.
Notification to Grant Patent Right for Inventionn CN201610822489X, dated Feb. 27, 2018, and English translation.
International Search Report of PCT application PCT/CN2016/100543, dated May 24, 2017, and English translation.
Written Opinion of the International Search Authority, dated May 24, 2017.
First search of priority document CN201610822489.X.
Supplementary search of priority document CN201610822489.X.

* cited by examiner

IMAGE ACQUISITION APPARATUS BASED ON INDUSTRIAL DIGITAL CAMERA MATRIX

CROSS REFERENCE TO RELATED APPLICATION

This Application is a Section 371 National Stage Application of International Application No. PCT/CN2016/100543, filed Sep. 28, 2016 and published as WO/2018/049698 A1 on Mar. 22, 2018, and claims priority to Chinese patent application no. CN201610822489.X, filed on Sep. 13, 2016, the contents of which are hereby incorporated by reference in their entirety.

TECHNICAL FIELD

The present disclosure relates to the technical field of optical electronic products, particularly to an image acquisition apparatus based on industrial digital camera matrix.

BACKGROUND ART

In order to obtain a three-dimensional image of an object to be photographed in an image taking manner, a following method is provided in the related art: arranging in a photographic scene four digital cameras having identical model and identical lenses in a form of 2×2 matrix, taking multiple pictures for the object to be photographed in the photographic scene with the four digital cameras, and performing image processing and operation on the acquired multiple pictures to obtain the three-dimensional image of the object to be photographed.

In the three-dimensional operation, as the cameras are in a form of planar matrix, the amount of the three-dimensional operation is greatly reduced, and the accuracy of the three-dimensional operation is improved. However, in this method, it is required that the horizontal rows of the cameras in a horizontal direction are aligned with each other, and the vertical columns of the cameras in a vertical direction are aligned with each other, that is to say, the cameras are required to form a rectangular structure with a precise geometric dimension, meanwhile, it is further required that photosensitive elements of the cameras are kept on the same horizontal plane. The higher the geometric precision of the matrix camera structure is, the higher the precision and accuracy of the corresponding measurement is.

At present, the four existing digital cameras may be installed on a fixed mechanical structure to satisfy the above requirements on the positional precision of the camera matrix structure by means of positioning the cameras precisely, but there are following problems in this method:
1. In the above related art, the camera matrix formed by four digital cameras is used to take pictures for the object to be photographed. As the digital camera itself has a housing, which has a certain dimension, the lens of each of the four digital cameras is located in the middle of the digital camera, and in an extreme case, a minimal distance between the lenses of two adjacent digital cameras is the width of the housing of one digital camera. In the related art, as the minimal distance between the lenses of two adjacent digital cameras is the width of the housing of one digital camera when the object is photographed, and the distance cannot be further reduced, the mechanism becomes large in size, meanwhile, the image taking manner in the related art fails to take an image at a closer distance, thus resulting in a limited photographing range for the three-dimensional image finally obtained, and failing to obtain a three-dimensional image for a close object.
2. As the manner of existing cameras plus a mechanical installation structure, which itself has error, is used, meanwhile, the optical axes, photosensitive surfaces, and housings of the cameras are inconsistent in geometric dimensions due to inconsistency in manufacturing, thus, it is finally impossible to ensure that the photosensitive elements are on the same horizontal plane, the optical axes of the photosensitive elements are parallel to each other, meanwhile a standard rectangular structure is formed as well. Although the above errors can be compensated through ex post calibration, the existence of the errors greatly affects the precision and accuracy of the three-dimensional calculation.

SUMMARY

In view of this, an object of the present disclosure is to provide an image acquisition apparatus based on industrial digital camera matrix, wherein by manufacturing, welding or fabricating photosensitive elements in a matrix structure on one plate, and installing lenses of a matrix structure on a fixed plate manufactured and mold in one step, geometric precision of relative positions of the photosensitive elements, parallelism of optical axes of the lenses, and geometric precision of the matrix structure are ensured, and a distance between adjacent lenses can also be reduced. With the above measures, higher precision and accuracy of the three-dimensional image, a larger measurement range, and higher integration level of the cameras are ensured, and the manufacturing and fabrication are facilitated, such that the apparatus becomes an integrated and miniaturized three-dimensional image collection apparatus in a real sense.

In a first aspect, embodiments of the present disclosure provide an image acquisition apparatus based on industrial digital camera matrix, including a first substrate and a second substrate disposed parallel to each other;

A lens matrix is provided on the first substrate, and axis of each of lenses in the lens matrix is respectively perpendicular to a plane where the first substrate is located;

A photosensitive element matrix is provided on a surface of the second substrate facing the first substrate, and each of the photosensitive elements in the photosensitive element matrix is disposed in one-to-one correspondence with each of the lenses.

In combination with the first aspect, the embodiments of the present disclosure provide a first possible implementation of the first aspect, wherein each of the lenses in the lens matrix is disposed in an m×n form, where m is greater than or equal to 2, and n is greater than or equal to 2.

In combination with the first possible implementation of the first aspect, the embodiments of the present disclosure provide a second possible implementation of the first aspect, wherein all of the lenses in a horizontal direction in the lens matrix are disposed at equal intervals, and interval between two adjacent lenses is greater than or equal to 10 mm;

all of the lenses in a vertical direction in the lens matrix are disposed at equal intervals, and interval between two adjacent lenses is greater than or equal to 10 mm.

In combination with the first aspect, the embodiments of the present disclosure provide a third possible implementation of the first aspect, wherein each of the photosensitive elements in the photosensitive element matrix is integrally formed with the second substrate; alternatively, each of the photosensitive elements in the photosensitive element matrix are installed on the second substrate by welding.

In combination with the third possible implementation of the first aspect, the embodiments of the present disclosure provide a fourth possible implementation of the first aspect, wherein it is required that the corresponding pixel rows in a horizontal direction are aligned with each other and the corresponding pixel columns in a vertical direction are aligned with each other when each of the photosensitive elements in the photosensitive element matrix is manufactured or welded.

In combination with the first aspect, the embodiments of the present disclosure provide a fifth possible implementation of the first aspect, wherein a control circuit board is further included, which includes analog-to-digital converters, a digital signal processor, a control module, and a communication module connected in sequence;

the analog-to-digital converters are configured to receive analog images sent by the photosensitive elements, and convert the analog images into digital images;

the digital signal processor is configured for systematically controlling the camera matrix to complete various control functions for image collection, including image collection, image transmission, image gain and shutter control, communication protocol interaction management, timer interruption, task switching, storage management, settings of camera parameters, collection mode, and definition of collection format;

the control module is configured to receive and send a photographing trigger signal, and to adjust photographing parameters of the lenses when the lenses are automatic lenses; and the communication module is configured to output the collected multiple digital images to an upper terminal according to a communication protocol under control of the digital signal processor.

In combination with the first aspect, the embodiments of the present disclosure provide a sixth possible implementation of the first aspect, wherein the first substrate is provided with installation through holes, and the lenses in the lens matrix are installed on the first substrate through the installation through holes.

In combination with the fifth possible implementation of the first aspect, the embodiments of the present disclosure provide a seventh possible implementation of the first aspect, wherein a fixed rear case is further included, which is fixedly connected to the first substrate, and the control circuit board is located inside the fixed rear case, and is fixedly connected to the second substrate through fixed columns.

In combination with the seventh possible implementation of the first aspect, the embodiments of the present disclosure provide an eighth possible implementation of the first aspect, wherein a power input port and a data communication interface are provided on the fixed rear case;

the power input port is configured to connect a power line, through which the photosensitive elements and the control circuit board are powered; and the data communication interface is configured to connect a data line, through which the control module and the digital signal processor receive a photographing parameter setting command and the photographing trigger signal, and the communication module outputs the multiple digital images through the data line.

In combination with the above embodiments of the first aspect, the embodiments of the present disclosure provide a ninth possible implementation of the first aspect, wherein the apparatus further includes a lens protection cover configured to protect each of the lenses in the lens matrix.

In the embodiments of the present disclosure, the lens matrix formed by multiple lenses is integrated on the same substrate, and the photosensitive element matrix formed by multiple photosensitive elements is integrated on the same substrate, maintaining that each of the photosensitive elements is disposed in one-to-one correspondence with each of the lenses. Compared with the related art, in the image acquisition apparatus based on industrial digital camera matrix in the embodiments of the present disclosure, since the multiple lenses are arranged on the same substrate and the photosensitive element matrix formed by the multiple photosensitive elements is integrated on the same substrate, the geometric precision of the relative positions of the photosensitive elements, the parallelism of the optical axes of the lenses, and the geometric precision of the matrix structure can be ensured, and also the distance between adjacent lenses can be reduced as required. The above measures ensure the higher precision and accuracy of the three-dimensional image, the larger measurement range, and the higher integration level of the cameras, and facilitate the manufacturing and fabrication, such that the apparatus becomes a three-dimensional image collection apparatus in a real sense.

In order to make the above objects, features, and advantages of the present disclosure more apparent and understandable, the preferred embodiments are particularly illustrated below, and are explained in details in combination with the accompanying drawings as follows.

BRIEF DESCRIPTION OF DRAWINGS

In order to illustrate the technical solutions of the embodiments of the present disclosure more clearly, accompanying drawings which are needed for the embodiments will be introduced briefly below. It should be understood that the accompanying drawings below merely show some embodiments of the present disclosure, therefore, they should not be considered as limiting the scope. A person ordinarily skilled in the art still can obtain other relevant drawings according to these accompanying drawings without any inventive effort.

Figure 1:
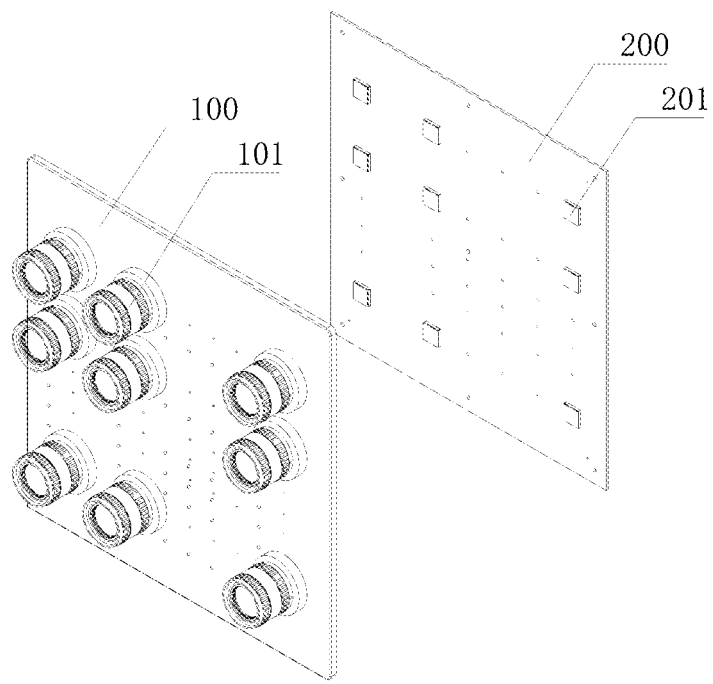
FIG. 1 shows a structural schematic diagram of an image acquisition apparatus provided in the embodiments of the present disclosure.

Reference Signs are as Follows:
first substrate 100, lens 101, installation through hole 102;
second substrate 200, photosensitive element 201;
control circuit board 300, fixed column 301;

fixed rear case 400, power input port 401, data communication interface 402.

DETAILED DESCRIPTION OF EMBODIMENTS

In order to make the objects, technical solutions, and advantages of the embodiments of the present disclosure clearer, the technical solutions in the embodiments of the present disclosure will be described clearly and completely below in combination with the accompanying drawings in the embodiments of the present disclosure. Apparently, some but not all of the embodiments of the present disclosure are described. Generally, components in the embodiments of the present disclosure, as described and shown in the accompanying drawings herein, may be arranged and designed in various different configurations. Therefore, the detailed description below of the embodiments of the present disclosure provided in the accompanying drawings is not intended to limit the scope claimed in the present disclosure, but merely illustrates the selected embodiments of the present disclosure. Based on the embodiments in the present disclosure, all other embodiments obtained by a person skilled in the art without any inventive effort shall fall within the scope of protection of the present disclosure.

Given that the image taking manner in the related art fails to take an image with a geometric positional relation satisfying the requirement on precision, the three-dimensional image finally obtained has limited precision and accuracy, and a more accurate three-dimensional image cannot be obtained, the present disclosure provides an image acquisition apparatus based on industrial digital camera matrix, which is specifically described below with embodiments.

FIG. 1 shows a structural schematic diagram of an image acquisition apparatus provided in the embodiments of the present disclosure. As shown in FIG. 1, the image acquisition apparatus in the embodiments of the present disclosure includes a first substrate 100 and a second substrate 200 disposed parallel to each other;

A lens matrix is provided on the first substrate 100, and axis of each of the lenses 101 in the lens matrix is respectively perpendicular to a plane where the first substrate 100 is located;

A photosensitive element matrix is provided on a surface of the second substrate 200 facing the first substrate 100, and each of the photosensitive elements 201 in the photosensitive element matrix is disposed in one-to-one correspondence with each of the lenses 101.

In the embodiments of the present disclosure, the lens matrix formed by multiple lenses is integrated on the same substrate, and the photosensitive element matrix formed by multiple photosensitive elements is integrated on the same substrate, maintaining that each of the photosensitive elements is disposed in one-to-one correspondence with each of the lenses. Compared with the related art, in the image acquisition apparatus based on industrial digital camera matrix in the embodiments of the present disclosure, since the multiple lenses are arranged on the same substrate and the photosensitive element matrix formed by the multiple photosensitive elements is integrated on the same substrate, the geometric precision of the relative positions of the photosensitive elements, the parallelism of the optical axes of the lenses, and the geometric precision of the matrix structure can be ensured, and also the distance between adjacent lenses can be reduced as required. The above measures ensure the higher precision and accuracy of the three-dimensional image, the larger measurement range, and the higher integration level of the cameras, and facilitate the manufacturing and fabrication, such that the apparatus becomes a three-dimensional image collection apparatus in a real sense.

In the embodiments of the present disclosure, the lenses are industrial lenses, each of which and a corresponding photosensitive element compose an industrial digital camera, thus forming an industrial digital camera matrix, referred to as camera matrix for short hereinafter, formed by multiple industrial digital cameras.

Each of the lenses 101 in the above lens matrix has identical model and type, which may be prime lens, or a zoom lens. Each of the photosensitive elements 201 in the above photosensitive element matrix functions to convert an optical signal captured by the corresponding lens 101 into an electrical signal so as to facilitate the subsequent image processing. The photosensitive element may be a CCD (Charge-coupled Device), or a CMOS (Complementary Metal Oxide Semiconductor), and of course, it also may be other commonly known electric devices that can be applied in an image acquisition process to realize the conversion of the optical signal to the electrical signal.

Since the optical signal captured by each lens 101 needs to accurately enter the corresponding photosensitive element 201, the first substrate 100 and the second substrate 200 should be ensured parallel to each other, and each of the photosensitive elements 201 should be disposed in one-to-one correspondence with each of the lenses 101.

The first substrate 100 and the second substrate 200 should be connected with such precision that the optical axes of the lenses 101 on the first substrate 100 are perpendicular to each of the photosensitive elements 201 on the second substrate 200 and pass through the centers of the photosensitive elements 201, meanwhile, a distance between a photosensitive surface of each photosensitive element 210 and the corresponding lens 101 should satisfy the requirements for clear imaging of the lens. In the embodiments of the present disclosure, preferably, each of the lenses 101 in the lens matrix are disposed in an m×n form, where m is greater than or equal to 2, and n is greater than or equal to 2.

Specifically, each of the lenses 101 in the lens matrix may be disposed in a form of 2×2, or in a form of 2×3, or in a form of 3×3, or in a form of 4×5, which will not be enumerated one by one herein.

In the present embodiment, arranging the various lenses 101 in a form of m×n can guarantee an appropriate framing range, thus photographing a complete object or a complete photographic scene.

Researches reveal that intervals between each of the lenses 101 in the lens matrix have an influence on the range of photographic field of view. In the present embodiment, preferably, all of the lenses 101 in a horizontal direction are disposed at equal intervals in the lens matrix, and the interval between two adjacent lenses 101 is greater than or equal to 10 mm, likewise, all of the lenses 101 in a vertical direction are disposed at equal intervals in the lens matrix, and the interval between two adjacent lenses 101 is greater than or equal to 10 mm.

By disposing each of the lenses 101 in the horizontal direction at equal intervals in the lens matrix, and disposing each of the lenses 101 in the vertical direction at equal intervals in the lens matrix, it facilitates ex post image three-dimensional processing and operation, and facilitates the manufacturing of the first substrate 100 as well as the installation of the lenses 101. In addition, given that when the intervals between each of the lenses 101 in the lens matrix are too large, the proximity of multiple pictures obtained by photographing declines, resulting in low precision of a finally synthesized three-dimensional image. In another preferred embodiment, preferably, all of the lenses 101 in the horizontal direction are disposed at equal intervals in the lens matrix, and the interval between two adjacent lenses 101 is greater than or equal to 10 mm and less than or equal to 120 mm, likewise all of the lenses 101 in the vertical direction are disposed at equal intervals in the lens matrix, and the interval between two adjacent lenses 101 is greater than or equal to 10 mm and less than or equal to 120 mm.

Having the interval between two adjacent lenses 101 in the horizontal direction or in the vertical direction greater than or equal to 10 mm and less than or equal to 120 mm, the problem that the proximity of each picture declines and resulting in low precision of the finally synthesized three-dimensional image can be avoided. Further, the image acquisition apparatus can be reduced in size, facilitating the manufacturing and processing of the image acquisition apparatus.

It should be noted that on the basis that the interval between two adjacent lenses 101 in the horizontal direction or in the vertical direction is greater than or equal to 10 mm, the upper limit of the intervals is not limited to 120 mm, but also may be 150 mm or 180 mm, which may be determined as practically required. Generally, the higher a focal length value of a lens, the wider the range of field of view of the object to be photographed, and the greater the intervals required between adjacent lenses.

In order to further ensure that the images taken by the multiple lenses 101 are regularly ordered, preferably, the interval between two adjacent lenses 101 in the horizontal direction in the lens matrix and that between two adjacent lenses 101 in the vertical direction in the lens matrix is equal.

A person skilled in the art could understand that each of the photosensitive elements 201 in the photosensitive element matrix is disposed in one-to-one correspondence with each of the lenses 101 in the lens matrix, therefore, the manner of laying out each of the photosensitive elements 201 in the photosensitive element matrix and the intervals between each of the photosensitive elements 201 are both consistent with those of each of the lenses 101, which will not be repeated redundantly herein.

In FIG. 1, each of the photosensitive elements 201 in the photosensitive element matrix is integrally formed with the second substrate 200; alternatively, each of the photosensitive elements 201 in the photosensitive element matrix is installed on the second substrate 200 by welding, wherein when the photosensitive elements 201 on the second substrate 200 are manufactured or welded, it is required that the corresponding pixel rows in a horizontal direction are aligned with each other, and corresponding pixel columns in a vertical direction are aligned with each other.

Various types of independent photosensitive element 201 existed in the related art all include CCD and/or CMOS, and the technology has been quite mature. According to the requirements such as range of field of view, measurement precision, and measurement speed, appropriate photosensitive elements 201 may be chosen, and then the corresponding second substrate 200 is designed. The second substrate 200 may be implemented in a manner of PCB (Printed Circuit Board), and then each of the photosensitive elements 201 are welded on the second substrate 200 according to the requirements of laying out the lenses 101 in the preceding. When the welding manner is used, in order to ensure welding precision, a dedicated photosensitive element positioning fixture may be used, ensuring positional precision of each of the photosensitive elements 201 after the welding.

The photosensitive elements 201 are welded on the second substrate 200 in a welding manner. At present, the photosensitive elements such as CCD and CMOS generally are all manufactured into a rectangular shape according to the number of rows and columns of pixels. Since it is required that in the three-dimensional operation the pixel rows of the corresponding coordinate positions in a same row should be on a same straight line, and meanwhile the pixel columns of the corresponding coordinate positions in a same column should be on a same straight line, it is required that in the present embodiment, when each of the photosensitive elements 201 forms a standard rectangular shape, positions where the pixels in the photosensitive element matrix are located (the positions are represented by values of rows and columns) also should form a corresponding rectangular structure, thus ensuring precision of the three-dimensional operation. Therefore, when the photosensitive elements 201 on the second substrate 200 are manufacturing or welding, it is required that the corresponding pixel rows in the horizontal direction are aligned with each other, and the corresponding pixel columns in the vertical direction are aligned with each other, thus ensuring precision of the three-dimensional operation.

Since the photosensitive elements such as CCD and CMOS have a pixel interval generally in the order of microns, it is quite hard to ensure the corresponding pixel rows or columns of the photosensitive elements 201 to be completely aligned in welding, a relative offset or a relative rotation of the corresponding pixel rows or columns will necessarily occur. In order to compensate for the above errors, the above manufacturing errors need to be measured and calibrated after the manufacturing, which may be performed by compensation in a three-dimensional calculation or by corrections on software.

Alternatively, the photosensitive elements 201 are integrally formed with the second substrate 200 in a synchronous manufacturing manner. According to the requirements on the matrix geometric precision, in order to ensure that each of the pixel positions in the photosensitive element matrix also form a standard rectangular structure to improve the precision and speed of the three-dimensional operation, the second substrate 200 can be customized such that each of the photosensitive elements 201 and the second substrate 200 are formed integrally, and each of the photosensitive elements 201 is manufactured in a process of manufacturing the second substrate 200, that is, equivalent to manufacturing a large CCD or CMOS formed by multiple photosensitive regions that form a rectangle. This method avoids the errors caused by the preceding welding method, and reduces the time for image operation, such that three-dimensional image data is more accurate.

Figure 2:
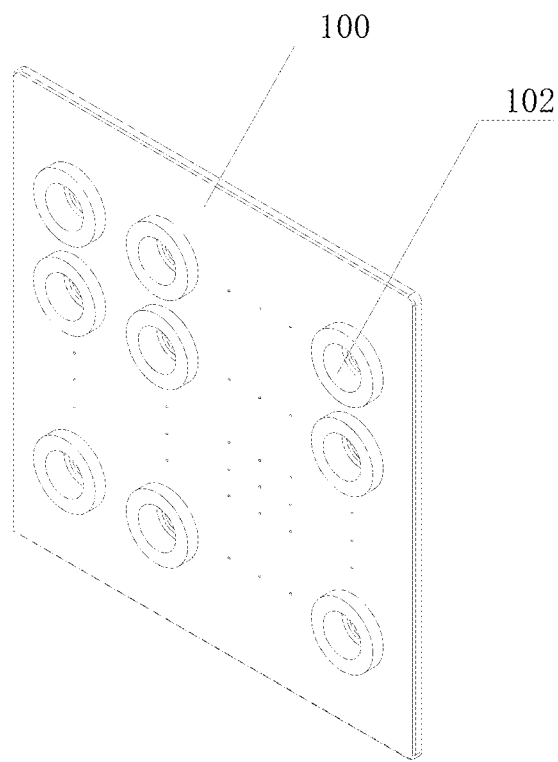
FIG. 2 shows a structural schematic diagram of a first substrate provided in the embodiments of the present disclosure.

FIG. 2 shows a structural schematic diagram of the first substrate 100 provided in the embodiments of the present disclosure. As shown in FIG. 2, the first substrate 100 is disposed with installation through holes 102, and the lenses 101 in the lens matrix are installed on the first substrate 100 through the installation through holes 102.

In the embodiments of the present disclosure, a manner of one-step molding with a manufacturing center, or a method of one-step molding with a model can be adopted for the first substrate, so as to ensure that the geometric precision of the first substrate meets the requirements. As a base of the installation and positioning of the whole collection device, the first substrate's geometric precision directly affects the precision of the cameras. The specific requirements on the geometric precision thereof are as follows: the lenses are parallel to upper and lower installation surfaces of the second substrate, a distance between the two surfaces satisfies the precision requirements for clear imaging, the lens installation through holes 102 are perpendicular to the first substrate, and the position precision of the installation through holes 102 meets the requirements, and so on.

In one embodiment, each lens 101 is provided with an external thread, each installation through hole 102 is provided with an internal thread, and the lenses 101 are installed on the first substrate 100 through the installation through holes 102 in a manner of threaded connection. In another embodiment, each lens 101 is provided with a first clamping structure, each installation through hole 102 is provided with a second clamping structure, and the lenses 101 are installed on the first substrate 100 through the installation through holes 102 in a clamping manner, wherein the clamping manner may be snap-fit connection.

Based on the preceding contents, since the lay-out manner of each of the lenses 101 and the intervals between each of the lenses 101 should meet certain requirements, each of the installation through holes 102 on the first substrate 100 also should meet the same requirements. The specific requirements can be seen in the preceding contents, and will not be repeated redundantly herein.

Figure 3:
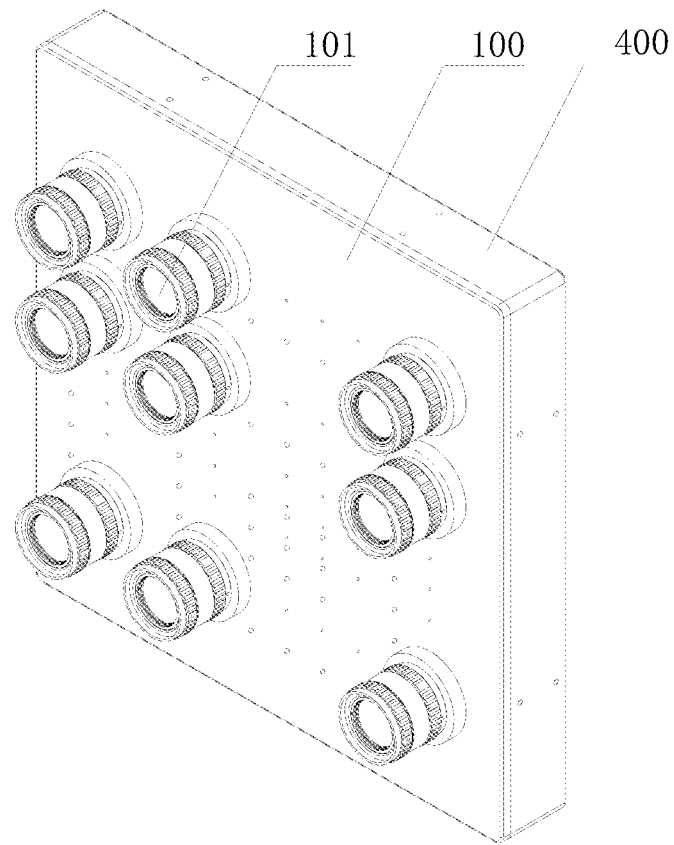
FIG. 3 shows an assembled schematic diagram of the image acquisition apparatus provided in the embodiments of the present disclosure.
Figure 4:
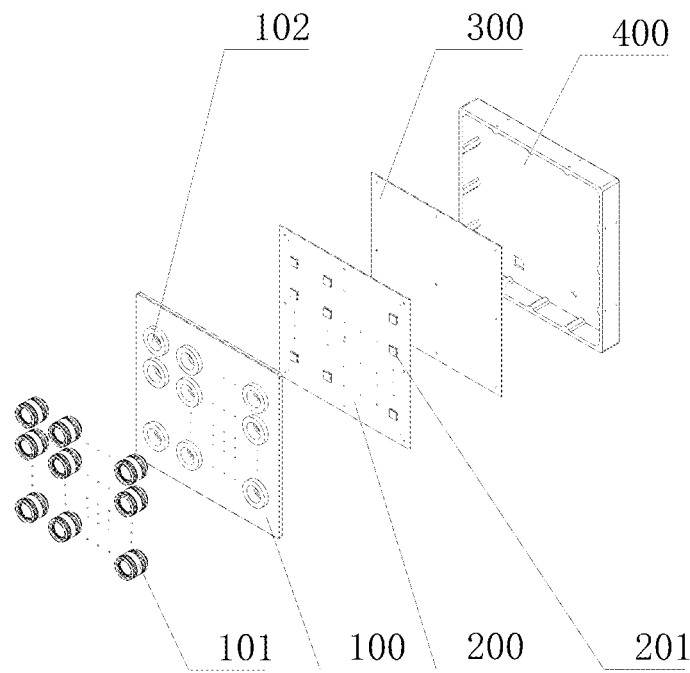
FIG. 4 shows an exploded schematic diagram of the image acquisition apparatus provided in the embodiments of the present disclosure.

FIG. 3 shows an assembled schematic diagram of the image acquisition apparatus provided in the embodiments of the present disclosure, and FIG. 4 shows an exploded schematic diagram of the image acquisition apparatus provided in the embodiments of the present disclosure. As shown in FIG. 3 and FIG. 4, the image acquisition apparatus in the present embodiment further includes a fixed rear case 400, the fixed rear case 400 is fixedly connected with the first substrate 100, and the second substrate 200 is located inside the fixed rear case 400. Wherein, the fixed rear case 400 may be threaded with the first substrate 100, and also may be clamped with the first substrate 100.

As shown in FIG. 4, the image acquisition apparatus in the present embodiment further includes a control circuit board 300, the control circuit board 300 is located inside the fixed rear case 400, and the first substrate 100, the second substrate 200, and the control circuit board 300 are arranged in sequence, the control circuit board 300 is fixedly connected with the second substrate 200 through the fixed columns 301, and the control circuit board 300 is configured to receive electrical signals output by the photosensitive elements 201, and to perform operations such as analog-digital conversion, data processing, storage, data output, settings of collection parameters, collection control, collection triggering, and lens control.

Figure 5:
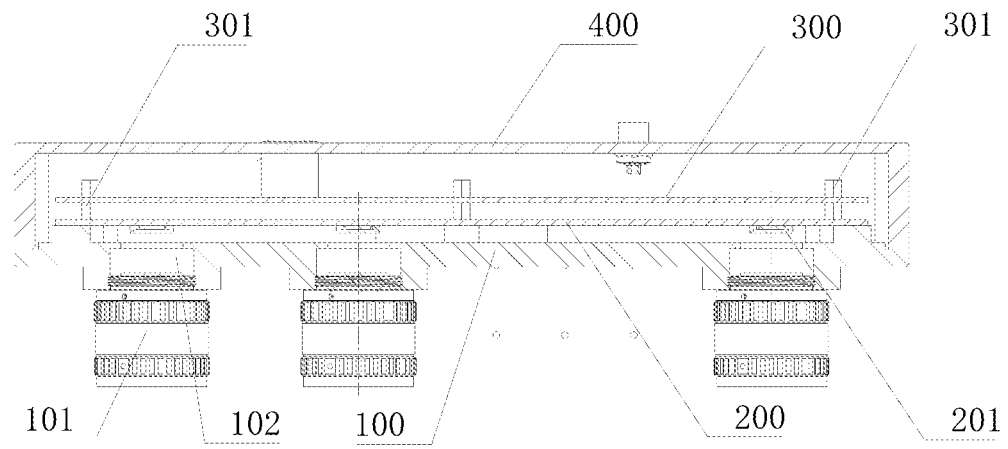
FIG. 5 shows an assembled sectional schematic diagram of the image acquisition apparatus provided in the embodiments of the present disclosure.

FIG. 5 shows a sectional schematic diagram of the assembled image acquisition apparatus provided in the embodiments of the present disclosure. As shown in FIG. 5, the second substrate 200 contacts with an upper surface of the first substrate 100, and the control circuit board 300 is fixedly connected with the second substrate 200 through the fixed columns 301, thus the second substrate 200 and the control circuit board 300 are both fixedly connected with the first substrate 100, achieving an object of installing and fixing the second substrate 200 and the control circuit board 300.

In the present embodiment, in order to ensure that the distance between each lens 101 and the corresponding photosensitive element 201 conforms to use standard, in a situation that the second substrate 200 is in contact with the first substrate 100, the first substrate 100 is provided with a thickness of 18.656 mm, or 13.656 mm. Wherein the first substrate 100 has a thickness of 18.656 mm when the lenses 101 are C mount lenses, and the first substrate 100 has a thickness of 13.656 mm when the lenses 101 are CS mount lenses.

It can be seen from FIG. 5 that a lower surface of the first substrate 100 is configured to install the lenses 101, and the upper surface of the first substrate 100 is configured to contact with the second substrate 200. The upper surface of the first substrate 100 includes convex structures located at two ends, and the thickness of the first substrate 100 refers to a distance between surfaces of the convex structures and a first surface.

Figure 6:
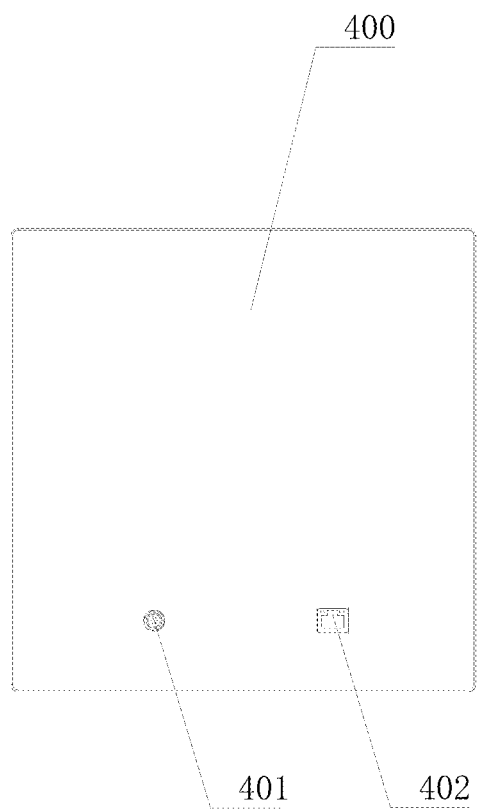
FIG. 6 shows a schematic diagram of a fixed rear case of the image acquisition apparatus provided in the embodiments of the present disclosure.

FIG. 6 shows a schematic diagram of the fixed rear case 400 of the image acquisition apparatus provided in the embodiments of the present disclosure. As shown in FIG. 6, the fixed rear case 400 is provided with a power input port 401 and a data communication interface 402. The power input port 401 is configured to connect a power line, and the photosensitive elements 201 and the control circuit board 300 are powered through the power line. The data communication interface 402 is configured to connect a data line to send data to the control circuit board 300 and output data output by the control circuit board 300.

In view of vulnerability of the lenses, in another embodiment, the image acquisition apparatus further includes lens protection covers, which cover surfaces of the lenses 101 for protecting each of the lenses 101 in the lens matrix. Preferably, the lens protection covers are fixedly connected with the first substrate 100 and cover each of the lenses 101 on the first substrate 100, so as to prevent the lenses 101 against damage. The lens protection covers may be of plastic material.

Figure 7:
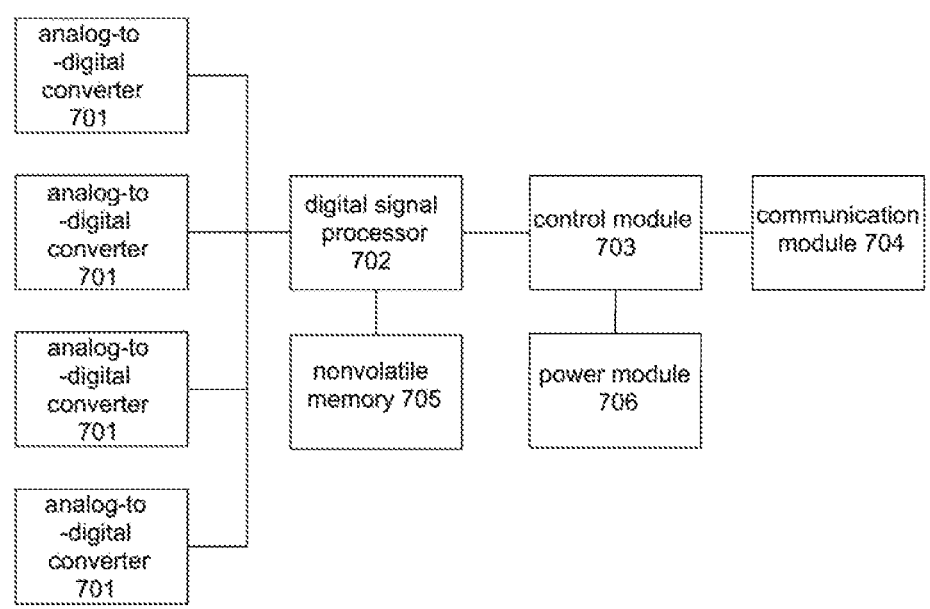
FIG. 7 shows a schematic diagram of module composition of a control circuit board provided in the embodiments of the present disclosure.

FIG. 7 is a schematic diagram of module composition of the control circuit board provided in the embodiments of the present disclosure. As shown in FIG. 7, the control circuit board 300 in the embodiments of the present disclosure includes analog-to-digital converters 701, a digital signal processor 702, a control module 703, and a communication module 704 connected in sequence; the analog-to-digital converters 701 are configured to receive analog images sent by the photosensitive elements 201, and convert the analog images into digital images; the digital signal processor 702 is configured for systematically controlling the camera matrix to complete various control functions for image collection, including image collection, image transmission, image gain and shutter control, communication protocol interaction management, timer interruption, task switching, storage management, settings of camera parameters, collection mode, definition of collection format and so on; the control module 703 is configured to receive and send a photographing trigger signal, and to adjust photographing parameters of the lenses 101 when the lenses 101 are automatic lenses; the communication module 704 is configured to output the collected multiple digital images to an upper terminal according to a communication protocol under the control of the digital signal processor 702, wherein the photographing parameters include a focal length, aperture, and sharpness of the lenses 101.

Specifically, the digital signal processor 702, similar to a CPU (Central Processing Unit) chip on an embedded computer, may be a DSP (Digital Signal Processing), ARM (Acorn RISC Machine, RISC microprocessor), FPGA (Field Programmable Gate Array) and other chips, and it is a control core of the whole image collection system. When the digital signal processor 702 runs, first, an embedded program is loaded to communicate with the upper terminal, an initialization command of the cameras is executed, the camera parameters, for example, time of exposure, trigger mode, and image gain, etc. are set, the internal parameters of the cameras, for example, camera serial numbers, are sent to the upper terminal. After a photographing command is obtained, image collection of each camera is controlled, and after the collection is completed, the images are transmitted in sequence to the upper terminal.

When soft trigger is used for taking the images, the upper terminal sends a photographing trigger signal to the communication module 704, the communication module 704 sends the photographing trigger signal to the digital signal processor 702, the digital signal processor 702 collects, according to the photographing trigger signal, the optical signals focused by the lenses 101 on the photosensitive elements 201 to obtain analog image signals, and controls the analog-to-digital converters 701 to convert the analog images into digital images, and controls the communication module 704 to output multiple digital images to the upper terminal.

When hard trigger is used for taking the images, the upper terminal sends a photographing trigger signal to the communication module 704, the communication module 704 sends the photographing trigger signal to the control module 703, the control module 703 sends the photographing trigger signal to the digital signal processor 702, the digital signal processor 702 controls the photosensitive elements 201 according to the photographing trigger signal to collect the optical signals focused on the photosensitive elements 201 to obtain analog image signals, and controls the analog-to-digital converters 701 to convert the analog images into digital images, and controls the communication module 704 to output digital images to the upper terminal.

In the embodiments of the present disclosure, the number of the analog-to-digital converters 701 is consistent with the number of the lenses 101 and the number of the photosensitive elements 201. In FIG. 7 four lenses are taken as an example for illustration.

As shown in FIG. 7, the control circuit board 300 further includes a nonvolatile memory 705 and a power module 706, and the power module 706 is respectively electrically connected with various electric devices on the control circuit board 300 to supply power to the various electric devices. The nonvolatile memory 705 is connected with the digital signal processor 702, and configured to store multiple digital images and variables generated by the digital signal processor 702 in an image processing process.

The above communication module 704 includes: a data interchange circuit or device and the corresponding output-input interfaces. The data interchange circuit or device, just like a network switch, can concentrate images collected by the camera matrix to a same network interface for output. Multiple network interfaces also may be used for parallel output, and the number of the output interfaces is corresponding to the time required for collecting the images.

The output-input interfaces of the communication module 704 include: a system bus interface, a network device interface, and an I/O control interface. The system bus interface, the network device interface, and the I/O control interface are respectively connected with the digital signal processor 702, and the network device interface and the I/O control interface are respectively connected with the power module 706. The system bus interface is configured to transmit the collected multiple digital images through a system bus. The network device interface is configured to transmit the obtained multiple digital images through the network device. The I/O control interface is connected with the control module 703, and is configured to receive the photographing trigger signal sent by an external device.

The above system bus interface includes, but is not limited to: RS-232/485 interface, 1394 interface, USB interface, and cameralink interface. The above network device interface includes, but is not limited to: RJ-45 interface, RJ-11 interface, SC fiber interface, FDDI interface, AUI interface, BNC interface, and Console interface, and further may be wireless network interfaces such as 3G, 4G, WIFI (Wireless-Fidelity).

Corresponding to the control circuit board 300 as shown in FIG. 7, the above data communication interface 402 is specifically configured to connect a data line, the control module 703 and the digital signal processor 702 receive, through the data line, a photographing parameter setting command and the above photographing trigger signal sent by the upper terminal, wherein the photographing trigger signal can be sent by the upper terminal of the image acquisition apparatus. The communication module 704 outputs the multiple digital images through the data line, preferably to the upper terminal of the image acquisition apparatus.

In the present embodiment, the second substrate 200 and the control circuit board 300 are connected therebetween through a circuit interface. In a specific circuit designing process, some modules of the control circuit board 300, for example, an analog-to-digital conversion circuit, can be moved up to the second substrate 200 according to the housing size and the specific situation, or some modules of the control circuit board 300 are divided into another circuit board in order to reduce the area of the circuit board. The above alterations do not affect the realization of the specific camera function, but just facilitate the design requirements on encapsulation and outline dimensions.

The image acquisition apparatus in the embodiments of the present disclosure can be placed in a photographic scene to take pictures for the object to be photographed, wherein each lens and the corresponding photosensitive element can compose an independent camera. In the embodiments of the present disclosure, multiple cameras forming parallel matrixes are manufactured inside one machine box, forming a three-dimensional image collection apparatus.

Before the image acquisition apparatus in the embodiments of the present disclosure is used to take images, some specific parameters of the apparatus are required to be calibrated and detected, wherein the contents of calibration and detection include: focal lengths, distortion, and geometric positions of optical axes of the lenses; geometric positional relations of the photosensitive elements, practically measured intervals, offset and rotation of rows and columns, and so on. A dedicated calibration device and software are required to be used for the calibration and detection. After the calibration is completed, the measured parameters should be provided to three-dimensional image processing software, and the relevant measurement dimensions are input into a three-dimensional operational formula to calculate a three-dimensional coordinate dimension, meanwhile, manufacturing and installation errors are compensated for by software to improve the precision of three-dimensional data.

The above image collection apparatus generally collects multiple planar two-dimensional images of an object in a synchronization manner. After the photographing signal is obtained, each photosensitive element acquires an optical signal transmitted by the corresponding lens. The control circuit board converts the optical signals into the corresponding electrical signals, and converts the electrical signals into a data format of the planar two-dimensional image. The multiple planar two-dimensional images obtained are transmitted through the data communication interface 402 to an external image data processing device to be processed, and by processing the multiple planar two-dimensional images with the external image data processing device, the three-dimensional image of the object to be photographed is further obtained.

Wherein, a process of processing the image data in a form of matrix planar two-dimensional image by the external image data processing device is as follows: performing a feature point matching operation for the multiple images photographed, calculating spatial position coordinates of feature points according to the matched feature point image coordinates, and calculating other three-dimensional dimensions of the measured object that need to be specifically measured according to the obtained spatial position coordinates of each of the feature points, to form three-dimensional point cloud data, and establish a three-dimensional point cloud graph, for three-dimensional reconstruction.

It should be noted that in the embodiments of the present disclosure, the matrix formed by four adjacent lenses 101 is provided as an image acquisition unit. When there are only four lenses 101, there is one image acquisition unit; and when there are more than four lenses 101, shift the matrix to the right or down by one lens each time, and determine the number of multiple image acquisition units according to a principle that the lenses can overlap. For example, when lens 101 is a matrix formed by six lenses, two image acquisition units are obtained, wherein two lenses 101 are in an overlapping state, appearing in both image acquisition units.

In the present embodiment, given that the matrix formed by four adjacent lenses 101 is the image acquisition unit, and the image acquired by each image acquisition unit is processed to obtain the three-dimensional image of the object to be photographed.

The manner of acquiring three-dimensional data of the object with the above image acquisition apparatus and the corresponding external image data processing device is the same as the manner of seeing the world with human eyes. Since the two-dimensional images are taken in the manner of planar matrix, like people seeing an object from different perspectives, three-dimensional outline dimensions of the object can be obtained by calculating the parallax of the same feature point on different position images through a standard program operation.

Since the amount of calculation of the three-dimensional operation is huge at present, an independent and small-scale circuit can hardly be competent for such huge operation, the three-dimensional operation has to be placed on a terminal for upper operation. In the future, as the functions of computing chips gradually become powerful and the power consumption decreases gradually, it is believed that circuit boards and chips in which the local three-dimensional data is processed automatically certainly will appear in the future.

It should be noted that similar reference signs and letters represent similar items in the following accompanying drawings, therefore, once a certain item is defined in one accompanying drawing, it is not needed to be further defined or explained in subsequent accompanying drawings.

In the description of the present disclosure, it should be noted that orientational or positional relationships indicated by terms such as "center", "upper", "lower", "left", "right", "vertical", "horizontal", "inner", and "outer" are based on orientational or positional relationships as shown in the accompanying drawings or that of a product of the present disclosure when it is conventionally placed in use. It is merely for facilitating describing the present disclosure and simplifying the description, rather than indicating or suggesting that the related devices or elements must have the specific orientation or configured and operated in a specific orientation, therefore, they should not be construed as limiting the present disclosure. Besides, terms such as "first", "second", and "third" are used merely to distinguish the description, but should not be construed as indicating or implying a relative importance.

In the description of the present disclosure, it further should be noted that unless otherwise specified and defined explicitly, terms "dispose", "install", "join", and "connect" should be construed in a broad sense. For example, it may be fixed connection, detachable connection, or integral connection; it may be mechanical connection and also electrical connection; it may be direct connection, indirect connection through an intermediate medium, or inner communication between two elements. For a person ordinarily skilled in the art, specific meanings of the above-mentioned terms in the present disclosure can be understood according to specific circumstances.

Finally, it should be noted that the embodiments above are merely specific embodiments of the present disclosure, for illustrating the technical solutions of the present disclosure, rather than limiting the present disclosure, and the scope of protection of the present disclosure should not be limited thereto. While the detailed description is made to the present disclosure with reference to the preceding embodiments, those ordinarily skilled in the art should understand that within the technical scope disclosed in the present disclosure, anyone familiar with the art still can make modifications or readily envisaged changes for the technical solutions recited in the preceding embodiments, or make equivalent substitutions to some of the technical features therein; these modifications, changes, or substitutions do not make the essential of the corresponding technical solutions depart from the spirit and scope of the technical solutions of the embodiments of the present disclosure, and they all should be covered within the scope of protection of the present disclosure. Therefore, the scope of protection of the present disclosure should be based on that of the claims.

What is claimed is:

1. An image acquisition device based on industrial digital camera matrix, comprising a first substrate, a second substrate disposed parallel to the first substrate, and a control circuit board,
   wherein a lens matrix is provided on the first substrate, and axis of each of lenses in the lens matrix is respectively perpendicular to a plane where the first substrate is located;
   a photosensitive element matrix is provided on a surface of the second substrate facing the first substrate, and each of the photosensitive elements in the photosensitive element matrix is disposed in one-to-one correspondence with each of the lenses,
   the control circuit board comprises analog-to-digital converters, a digital signal processor, a control module, and a communication module connected in sequence,
   wherein the analog-to-digital converters are configured to receive analog images sent by the photosensitive elements, and convert the analog images into digital images;
   the digital signal processor is configured for systematically controlling the camera matrix to complete various control functions for image collection, including image collection, image transmission, image gain and shutter control, communication protocol interaction management, timer interruption, task switching, storage management, settings of camera parameters, collection mode, and definition of collection format;

the control module is configured to receive and send a photographing trigger signal, and adjust photographing parameters of the lenses when the lenses are automatic lenses; and the communication module is configured to output the collected multiple digital images to an upper terminal according to a communication protocol under control of the digital signal processor.

2. The device according to claim 1, wherein each of the lenses in the lens matrix is disposed in an m×n form, where m is greater than or equal to 2, and n is greater than or equal to 2.

3. The device according to claim 2, wherein all of the lenses in a horizontal direction in the lens matrix are disposed at equal intervals, and an interval between two adjacent lenses is greater than or equal to 10 mm;

all of the lenses in a vertical direction in the lens matrix are disposed at equal intervals, and the interval between two adjacent lenses is greater than or equal to 10 mm.

4. The device according to claim 1, wherein each of the photosensitive elements in the photosensitive element matrix is integrally formed with the second substrate; alternatively, each of the photosensitive elements in the photosensitive element matrix is installed on the second substrate by welding.

5. The device according to claim 4, wherein it is required that the corresponding pixel rows in a horizontal direction are aligned with each other and the corresponding pixel columns in a vertical direction are aligned with each other when each of the photosensitive elements in the photosensitive element matrix is manufactured or welded.

6. The device according to claim 1, wherein the first substrate is provided with installation through holes, and the lenses in the lens matrix are installed on the first substrate through the installation through holes.

7. The device according to claim 1, further comprising a fixed rear case fixedly connected to the first substrate, wherein the control circuit board is located inside the fixed rear case, and is fixedly connected to the second substrate through fixed columns.

8. The device according to claim 7, wherein a power input port and a data communication interface are provided on the fixed rear case, wherein the power input port is configured to connect a power line, through which the photosensitive elements and the control circuit board are powered; and the data communication interface is configured to connect a data line, through which the control module and the digital signal processor receive a photographing parameter setting command and the photographing trigger signal, and the communication module outputs the multiple digital images through the data line.

9. The device according to claim 1, further comprising a lens protection cover configured to protect each of the lenses in the lens matrix.

10. The device according to claim 2, further comprising a lens protection cover configured to protect each of the lenses in the lens matrix.

11. The device according to claim 3, further comprising a lens protection cover configured to protect each of the lenses in the lens matrix.

12. The device according to claim 4, further comprising a lens protection cover configured to protect each of the lenses in the lens matrix.

13. The device according to claim 5, further comprising a lens protection cover configured to protect each of the lenses in the lens matrix.

14. The device according to claim 6, further comprising a lens protection cover configured to protect each of the lenses in the lens matrix.

15. The device according to claim 7, further comprising a lens protection cover configured to protect each of the lenses in the lens matrix.

16. The device according to claim 8, further comprising a lens protection cover configured to protect each of the lenses in the lens matrix.

* * * * *